United States Patent [19]

Kowalski, Jr.

[11] Patent Number: 5,162,053
[45] Date of Patent: Nov. 10, 1992

[54] VEHICULAR BRAKE MATERIAL COLLECTION SYSTEM

[76] Inventor: Walter J. Kowalski, Jr., Old Rte. 22, P.O. Box 290, Wassaic, N.Y. 12592

[21] Appl. No.: 296,322

[22] Filed: Jan. 11, 1989

Related U.S. Application Data

[63] Continuation of Ser. No. 100,532, Sep. 24, 1987, abandoned.

[51] Int. Cl.$^5$ .............................................. B01D 50/00
[52] U.S. Cl. ................................... 55/385.3; 55/467; 188/218 XL; 188/218 A
[58] Field of Search .................... 55/383, 385.1, 385.3, 55/467–469; 188/218 A, 382

[56] References Cited

U.S. PATENT DOCUMENTS

| | | | |
|---|---|---|---|
| 850,708 | 4/1907 | Weaver | 180/84 |
| 874,962 | 12/1907 | Hughes | 180/84 |
| 891,714 | 6/1908 | Morgan | 180/84 |
| 1,406,530 | 2/1922 | Brenneisen | 180/84 |
| 1,605,350 | 11/1926 | Klisch | 180/84 |
| 1,775,521 | 9/1930 | Goostray | 188/218 A |
| 1,801,966 | 4/1931 | Maddocks | 180/84 |
| 1,919,343 | 7/1933 | Payne | 188/218 A X |
| 2,042,750 | 6/1936 | Van Halteren | 188/218 A |
| 2,406,487 | 8/1946 | Brewer | 55/467 X |
| 2,921,654 | 1/1960 | Bradfield et al. | 188/218 A |
| 2,988,173 | 6/1961 | Romine | 188/1 |
| 3,142,364 | 7/1964 | Mikkelson | 188/264 |
| 3,204,393 | 9/1965 | Eklund | 55/467 X |
| 3,631,423 | 12/1971 | Groom | 55/467 X |
| 3,731,291 | 5/1973 | Walsh | 55/467 X |
| 3,892,285 | 7/1975 | Bruni | 180/75 |
| 4,120,675 | 10/1978 | Boyles et al. | 55/385 B X |
| 4,317,508 | 3/1982 | Katagiri et al. | 188/218 A |
| 4,620,616 | 11/1986 | Martin | 188/218 A X |

FOREIGN PATENT DOCUMENTS

| | | | |
|---|---|---|---|
| 186522 | 10/1983 | Japan | 55/467 |
| 678221 | 8/1979 | U.S.S.R. | 188/218 A |
| 940801 | 7/1982 | U.S.S.R. | 55/467 |
| 406347 | 2/1934 | United Kingdom | 188/218 A |

Primary Examiner—Robert Spitzer
Attorney, Agent, or Firm—Joseph L. Spiegel

[57] ABSTRACT

A vehicular brake material collection system collects brake material dust particles emanating from both the brake friction material and the brake rotary member in a disc brake or a drum brake. The system includes a particle collection chamber around and/or suction nozzles in proximity to the friction material, the chamber and/or nozzles being connected to a suction system that carries such particles into a filter or separator as the vehicle operates. The particles are thereby collected for later safe removal and disposal.

3 Claims, 2 Drawing Sheets

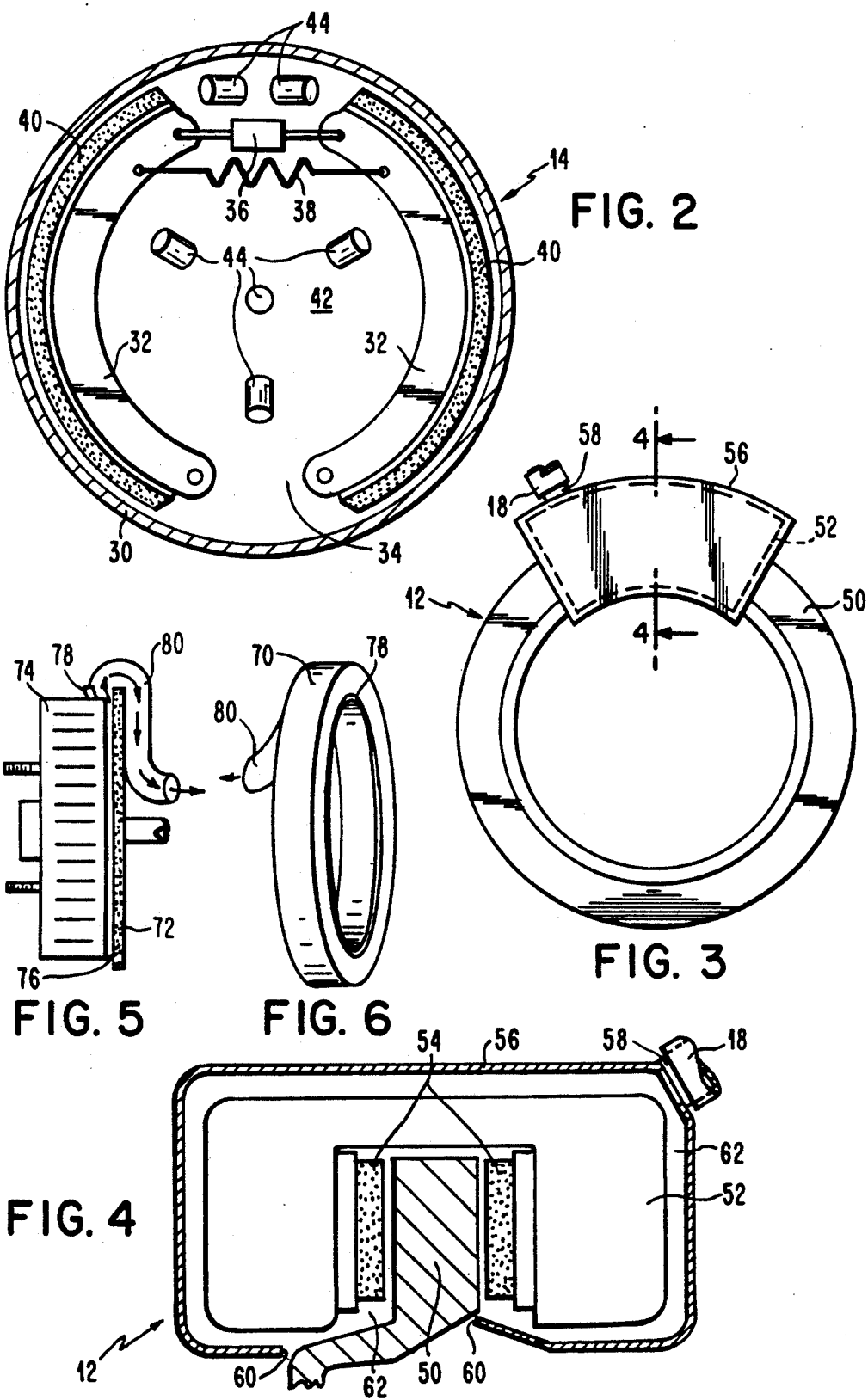

VEHICULAR BRAKE MATERIAL COLLECTION SYSTEM

This application is a continuation of application Ser. No. 07/100,532, filed Sep. 24, 1987, now abandoned.

FIELD OF THE INVENTION

This invention relates to a system for collecting particles of brake materials generated by the operation of a vehicular brake system and preventing such particles from entering and polluting the general atmosphere.

REFERENCE TO DOCUMENT DISCLOSURE

There is disclosure of subject matter of this application in Document Disclosure filed in the United States Patent and Trademark Office under No's 136781 and 142663.

BACKGROUND OF THE INVENTION

Vehicular brake systems are designed to stop or slow down a vehicle by converting the kinetic energy of the vehicle to thermal energy using the principle of friction. Such systems generally utilize a friction component, such as a pad or lining of friction material, which is pressed against a moving surface that rotates with a wheel to develop a frictional force that retards motion. The kinetic energy of the vehicle is thus converted to heat energy by friction between the friction component and the rotating component on the vehicle. The heat energy is then dissipated into the atmosphere.

Two well known types of brakes are drum brakes and disc brakes. In the former, the friction component is a lining carried on a brake shoe, which lining is pressed against a brake drum that is connected to and rotates with a wheel. A disc brake generally comprises two friction pads disposed on opposite sides of a disc that rotates with a wheel. In both types, whenever a friction component is forced against the rotating component, some of the friction material as well as some of the rotary member material is ground or broken off and forms fine particles. Brake materials include: asbestos, which is a well known pollutant; metals such as lead, copper and zinc; graphite; and, ceramics. The invention is designed to collect such fine particles and prevent them from becoming airborne outside the vehicle and thereby polluting the atmosphere.

PRIOR ART

While there are many known ideas for collecting or preventing dust particles from interfering with operation of a vehicle, there are to my knowledge and belief no prior art systems for collecting particles of brake friction materials and rotary member material particularly in the manner of my invention which is to create a suction effect in the immediate vicinity of the friction material to thereby carry particles emanating from such material and the rotary member to a filter or separation element where the particles are collected before becoming airborne in the general atmosphere outside the vehicle.

U.S. Pat. No. 874,962—Hughes discloses a dust protector for tractors in which a positive pressure curtain of air is created around driving gears of the tractor to blow dust away and prevent it from coming into contact with such parts. U.S. Pat. No. 3,892,285—Bruni teaches a way to prevent dust from entering the gear housing of a farm tractor, in which a bell shaped member, surrounding the inlet into the housing, cooperates with a brake disc the rotation of which creates a swirling of air within the bell shaped member causing any dust to be expelled from the interior by centrifugal action.

Several patents show different dust collectors for automobiles for collecting dust raised by the passage of its tires over dirt or dusty roads. Inlets are mounted on the vehicle rearwardly of the tires and are connected to some form of a suction system and a separator which collects the dust for subsequent discharge along the roadway or removal. Examples of such systems are disclosed in U.S. Pat. No. 850,708—Weaver, U.S. Pat. No. 891,714—Morgan, U.S. Pat. No. 1,406,530—Brenneisen, and U.S. Pat. No. 1,605,350—Klisch.

U.S. Pat. No. 1,801,966—Maddocks teaches an auto vacuum cleaning system wherein suction for a movable cleaning nozzle is derived from operation of the car engine.

U.S. Pat. No. 3,142,364—Mikkelson teaches air circulating brake shield baffles designed to circulate air in a brake drum in such a manner as to cool the brakes and to prevent dust from settling between the brake drum and brake lining. The dust is expelled into the open atmosphere and is not collected.

U.S. Pat. No. 2,988,173—Romine discloses a magnetic collector disposed in a brake drum for collecting magnetic particles from a ferrous drum.

While the above patents are the closest prior art known to me, none recognize the problem of pollution caused by particles emanating from the friction material of a brake unit (or, for that matter, material from the rotating component), nor does any patent teach a way to collect such particles and prevent them from being introduced into the general atmosphere.

SUMMARY OF THE INVENTION

One of the objects of the invention is to provide a brake material collection system usable in a vehicle, such as an automobile, to collect particles emanating from the friction or brake material as well as particles from the brake's rotating component and thereby prevent such particles from entering and polluting the atmosphere.

Another object is to provide a system for collecting brake particles coming from the friction material of a brake pad or lining and from the brake's rotating component, by sucking such particles into a collection system for safe disposal at a later time.

Still another object is to provide a brake particle collection system in which a vacuum or suction, used to collect the particles as they emanate from the friction material and the rotating component, is derived directly or indirectly from operation of the vehicle engine.

A further object is to provide a brake particle collection system in which a filter and/or separation device is used to separate brake material particles from a flow of air in which such particles are entrained.

Briefly, the manner in which the above and other objects of the invention are attained is to provide a brake material collection system in which, for each brake assembly on a vehicle, a particle collection chamber (PCC) encompasses or surrounds the brake friction material of the assembly. A conduit is connected to the chamber and to a suction system to cause brake particles to be picked up and sucked from the chamber into the conduit. The conduit is in turn connected to a filter or separator which collects the particles. In addition to the particle collection chamber, suction nozzles, judiciously situated and aimed at the brake unit, can also be connected by conduits to the suction system. The nozzles will ensure the collection of any particles which may happen to escape the PCC.

DRAWINGS

Other objects and advantages of the invention will be apparent from the following description taken in connection with the accompanying drawing wherein:

FIG. 2 is an elevational view, partly in section and with portions removed, of the drum brake shown in FIG. 1;

FIG. 3 is an elevational view of the disc brake shown in FIG. 1.

FIG. 4 is an enlarged cross sectional view, partly schematic, looking along reference lines 4—4 of FIG. 3;

FIG. 5 is an alternate embodiment of the invention showing, partly in schematic, a ring shaped collector; and, FIG. 6 is a perspective view of the collector of FIG. 5.

DETAILED DESCRIPTION OF THE INVENTION

Figure 1:
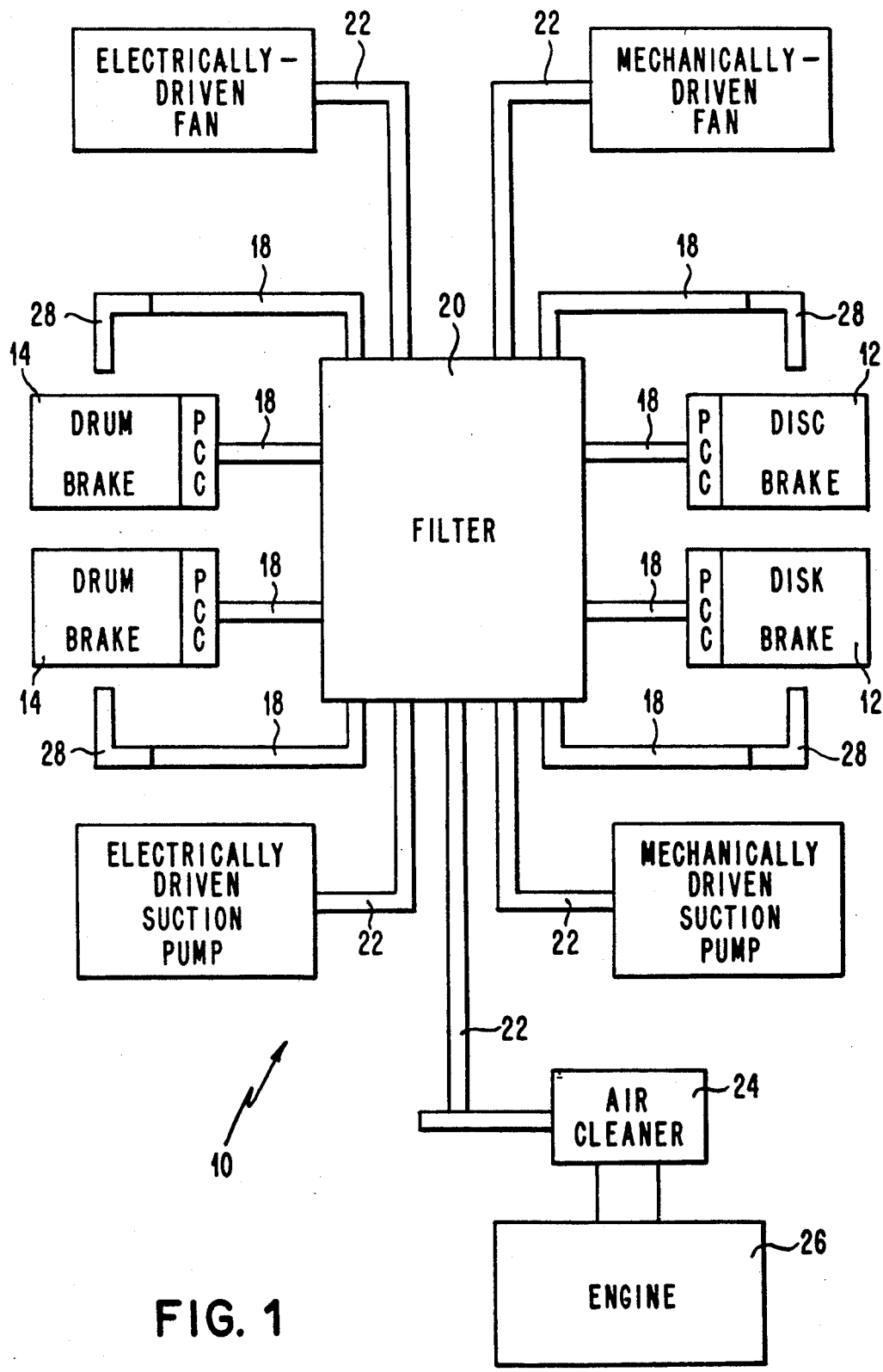
FIG. 1 is a schematic diagram illustrating the invention.

Referring now to the drawing, FIG. 1 shows a vehicular brake material collection system 10 incorporated in a vehicle having front disc brake assemblies 12 and rear drum brake assemblies 14. Each assembly includes or is associated with a particle collection chamber (PCC) the details of which differ according to the type of brake assembly, as described in greater detail hereafter. Each PCC and nozzle are connected by conduits 18 to a central filter 20 that is further connected by a conduit 22 to the inlet of an air cleaner 24 mounted on the engine 26 of the vehicle. Also shown are suction nozzles 28 directed at each brake unit. Engine 26 provides, by its normal operation, a source of a vacuum which is transmitted through the air cleaner 24 and filter 20 by the conduits so that particles of brake material collected in each of the PCC's and by each nozzle 28 are sucked into and collected by filter 20 for later removal and disposal. It is expected that not all particles would be removed or collected by filter 20 and that some particles would also be collected by the filter in air cleaner 24. Thus, filter 20 is the primary collector and the air cleaner 24 is a secondary collector. Also shown in the brake material collection system of FIG. 1 are four other vacuum sources connected by conduits 22 to filter 20; an electrically driven fan, a mechanically driven fan, an electrically driven vacuum pump, and a mechanically driven vacuum pump. Any one of these five vacuum sources, or any combination of these five sources, is capable of achieving the desired effect.

As shown in FIG. 2, drum brake assembly 14 includes a conventional rotary brake drum 30 and two brake shoes 32 mounted upon a stationary backing plate 34. A conventional brake cylinder 36 and return spring 38 operate the brake shoes to brake the vehicle in conventional fashion. The space enclosed by brake drum 30 and plate 34 forms PCC 42.

Brake shoes 32 include arcuate pads 40 of brake or friction material which during the course of brake operation wears down gradually by the breaking off of particles thereof. Such particles upon being broken off of pads 40 become airborne in PCC 42. A series of collector nozzles 44 are mounted on plate 34 and are connected to conduit 18 whereby particles entering the nozzles are sucked into filter 20. The nozzles are disposed and oriented in PCC 42 in different ways. Some are located near the outer periphery of PCC 42 at substantially the same radial distance as pads 40 to pick up particles nearer the points at which they break off from pads 40 whereas other nozzles are arranged in the interior of PCC 42 to pick up particles that fall or migrate into such interior areas or spaces.

With reference to FIGS. 3 and 4, disc brake assembly 12 comprises a conventional rotary disc 50 and a stationary brake caliper 52 having two pads 54 of friction material disposed on opposite sides of disc 50. Actuation of the caliper causes each pad 54 to move against disc 50 in conventional manner. A shroud 56 is generally connected to, though it need not be, and substantially surrounds caliper 52. Shroud 56 has an opening therein bounded by edges 60 through which disc 50 extends into the interior of the shroud. The shroud 56 is generally spaced from caliper 52 to form PCC 62 therebetween, thus achieving the general envelopment of the caliper. Shroud 56 further has an outlet 58 connected to conduit 18 whereby the vacuum in such conduit causes particles broken off of pads 54 and rotor 50 to be sucked from PCC 62 into filter 20. The edges 60 are spaced sufficiently close to disc 50 to prevent as many of the brake material particles as possible from being carried outside PCC 62 while at the same time avoiding interference with disc 50.

With reference to FIGS. 5 and 6, an alternate or supplementary embodiment of the invention is shown in which a ring shaped collector 70 is positioned just beyond the circumference of backing plate 72 and brake drum 74 to form PCC 76. Sealing gasket 78 enhances collector effectiveness in applying suction force and drawing particles from the linings (not shown) as well as the brake drum. Collector 70 further has an outlet 80 which communicates with conduit 18.

It should be obvious to those skilled in the art that many changes and variations may be made in adapting the invention to the many different sizes and shapes of brake assemblies and vehicles. For instance, in the case of the vacuum source created by the engine, filter 20 could be eliminated because the engine's air cleaner 24 is capable of performing the act of particle collection. Further, the connection to a vacuum source created by engine 26 can be made at locations other than through air cleaner 24, in which case filter 20 would have to be used. Instead of using the engine directly as the vacuum source, an electrically or mechanically driven fan or vacuum pump could create the source. These four possible vacuum sources are shown in FIG. 1. Further, any of these four particular sources can be alternately positioned in any of the conduits 18 between the brake units and filter 20. The invention can function with any one or any combination of these five vacuum sources. In connection with disc brake assemblies, some types require provision for some lateral movement between the disc and other parts of the assembly so that some or all of edges 60 cannot be located so close to the disc as to cause interference therewith. In such circumstances, a flexible seal or gasket can be used to minimize the movement of particles outside the PCC. Other changes can be made without departing from the spirit and scope of the invention as defined in the claims.

What is claimed is:

1. A system for collecting particles of friction material and rotary brake member material in a vehicular brake system having a rotary brake member and a friction element for engaging said brake member, said friction element being composed of said friction material, comprising:

means for receiving brake material particles from said friction element and said rotary brake member;

a vacuum or suction source;

conduit means having one end connected to said vacuum or suction source and another end connected to said brake material receiving means whereby said source is operative to suck said particles from said brake material receiving means through said conduit means;

and an air filter for a vehicle engine connected to said conduit means between said brake material receiving means and said source for collecting said particles.

2. A system for collecting particles of friction material and rotary brake member material in a vehicular brake system having at least one brake assembly including a rotary brake member and a friction element for engaging said brake member, the system comprising in combination:

means including a first brake material particle collection chamber enclosing at least a portion of said friction element for receiving brake material particles from said friction element and said rotary brake member;

a second particle collection chamber for receiving particles from said first chamber, said second particle collection chamber including an air filter for a vehicle engine;

conduit means interconnecting said first and second chambers;

and means for providing suction in said first chamber and conduit means for sucking said particles from said first chamber through said conduit means and into said second chamber.

3. A system for collecting particles of friction material and rotary brake member material in a vehicular brake system having at least two brake assemblies each including a rotary brake member and a friction element for engaging said brake member, the system comprising in combination;

means including first and second brake material particle collection chambers respectively associated with said brake assemblies and enclosing at least a portion of said friction elements for receiving brake material particles from said friction elements and said rotary brake members;

a third brake material particle collection chamber for receiving particles from both said first and second collection chambers, said third collection chamber including an air cleaner of an automobile engine;

conduit means interconnecting said first and second chambers with said third chamber;

and means for providing suction in said first and second chambers, said suction means comprising the engine of an automobile including the two brake assemblies, and conduit means for sucking said particles from said first and second chambers through said conduit means and into said third chamber.

* * * * *